July 14, 1953 G. BONMARTINI 2,645,437
AIRCRAFT MULTIWHEEL CONTINUOUS TREAD LANDING GEAR
Filed May 22, 1950 2 Sheets-Sheet 1
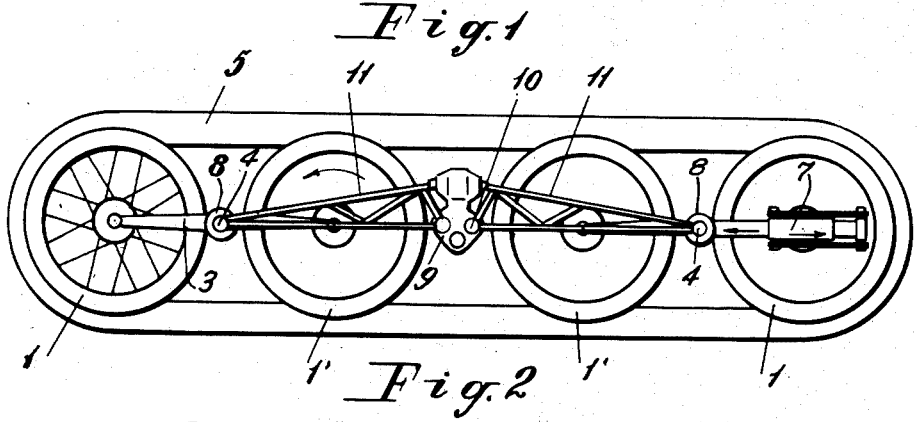
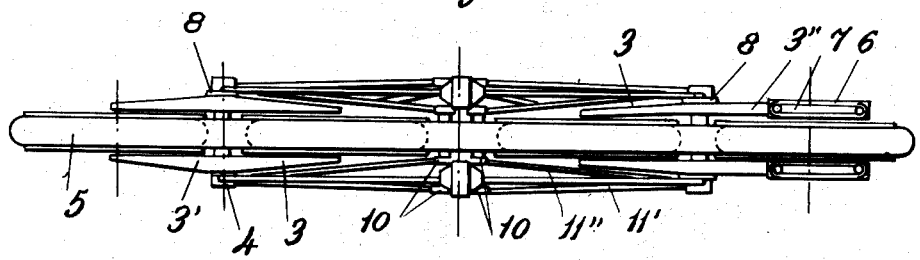
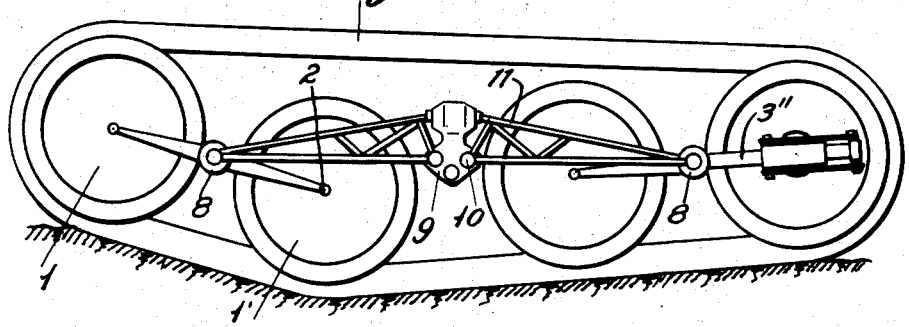
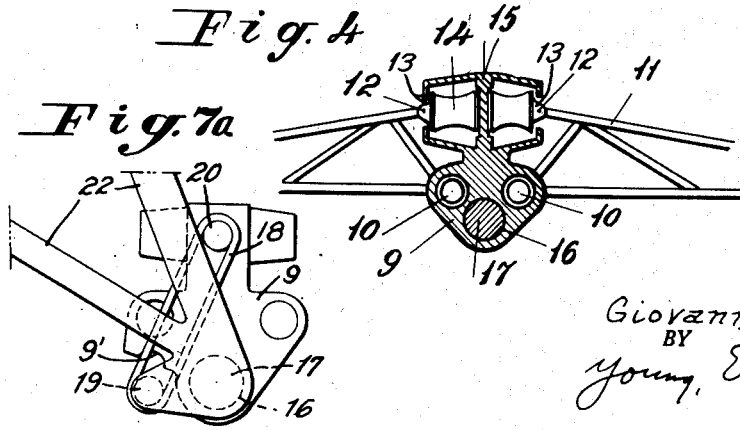
INVENTOR.
Giovanni Bonmartini July 14, 1953  G. BONMARTINI  2,645,437
AIRCRAFT MULTIWHEEL CONTINUOUS TREAD LANDING GEAR
Filed May 22, 1950  2 Sheets-Sheet 2
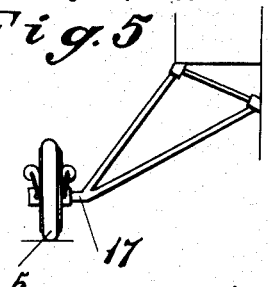
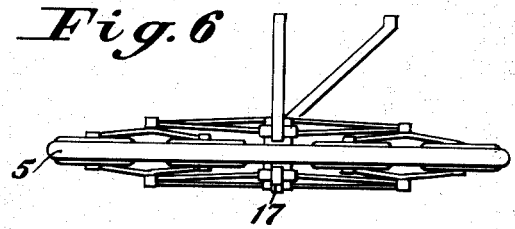
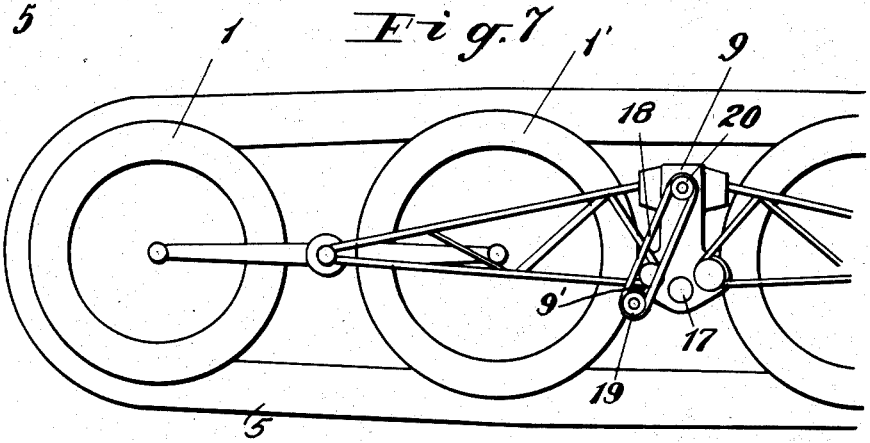
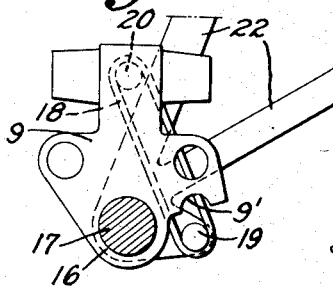
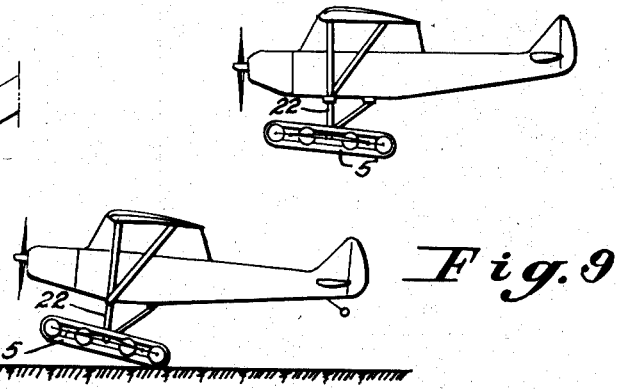
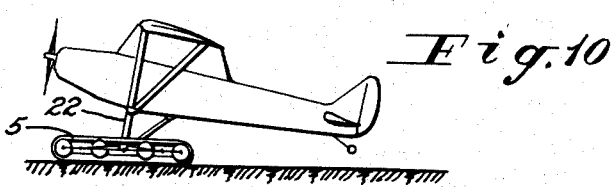
INVENTOR.
Giovanni Bonmartini
BY
Young, Emery & Thompson
Attys.

Patented July 14, 1953

2,645,437

UNITED STATES PATENT OFFICE 2,645,437

AIRCRAFT MULTIWHEEL CONTINUOUS TREAD LANDING GEAR

Giovanni Bonmartini, Rome, Italy, assignor to "EST"-Etablissement Sciences Techniques, Vaduz, Liechtenstein, a firm Application May 22, 1950, Serial No. 163,452
In Italy May 9, 1950

11 Claims. (Cl. 244—103)

The present invention relates to a multiwheel landing gear supporting a pneumatic Caterpillar track which consists of a stretched, tubular, continuous tire, flexible but inextensible, which can be for instance, of the same type, as set forth in my applications Serial No. 47,164, filed September 1, 1948; Serial No. 91,304, filed May 4, 1949; Serial No. 150,666, filed March 20, 1950, and my U. S. Patent No. 2,621,085 of December 9, 1952.

The aforesaid Caterpillar landing gear is used instead of the standard landing gear for aircraft which land on uneven ground or on any runway or ground which requires that the stress transmitted by the vehicle per superficial unit, vary between very large limits.

The present invention provides a supporting frame for the aforementioned tubular Caterpillar tire, comprising rocker arms pivoted to the supporting legs of the airplane; the landing gear of the airplane comprises two or more trains or sets of wheels.

The landing gear has the following characteristics: it affords a good stability to the whole unit, it takes automatically the best position so as to pass over the obstacles on the ground; the reaction of the ground is apportioned on the maximum possible area on the tubular pneumatic Caterpillar tire. The invention is moreover characterised by the fact that the supporting frames of the two or more sets of wheels are connected to the trestle which forms the legs of the airplane, by means of pivots. Readjusting gears are provided moreover so that the landing gear can take a special position when the airplane flies, this special position allowing the plane to come gradually in contact with the ground, when landing, so that the pneumatic Caterpillar track or tire begins to move slowly, the speed increasing gradually, with no sharp variation of the motion and consequent production of high stresses.

The accompanying drawing is a construction of the invention in an illustrative manner and not as limiting the invention. In these drawings:

Fig. 1 is a lateral view of the landing gear.

Fig. 2 is the landing gear in plan.

Fig. 3 is a lateral view of the landing gear, its different parts having the adequate position for the passing over of a ground depression.

Fig. 4 shows a partial sectional view, in an enlarged scale, of the central part of the landing gear, the connection to the leg of the plane being included.

Fig. 5 is a front view of one leg of the airplane, connected with the landing gear.

Fig. 6 is a view in plan of the part shown in Fig. 5.

Fig. 7 is a lateral view of the part of the landing gear which is connected to the readjusting gear.

Fig. 7a is an enlarged detail side elevation of the central part of the landing gear taken on one side;

Fig. 7b is a similar view taken on the opposite side of the landing gear.

Figs. 8–10 show schematically the position of the Caterpillar track or tire in respect of the airplane during its flight (Fig. 8), when the airplane comes in contact with the ground (Fig. 9) and in a taxiing position.

The train or set of wheels of the landing gear shown in the drawings has four aligned wheels. The aforementioned wheels have a grooved section.

The wheels 1 are aligned; they are supported in pairs by a secondary bogie or subframe. In the construction shown in the drawing, every principal frame comprises a front subframe and a rear subframe. These two aforementioned subframes consist of two girders each. The wheels 1 are placed in the space situated between the two girders.

The two subframes are supported by a central frame by means of axles 4. The subframes support two wheels 1 each of the wheels being placed one at each end of the aforesaid girders.

The two supporting girders of the subframes are divided by the axle 4 in two parts or arms 3 and 3' or 3". The length of the front arm 3' of the front subframe and the length of the rear arm 3" of the rear subframe are slightly less than the length of the rear arm 3 of the front subframe, and of the front arm 3 of the rear subframe. That is to say: considering the principal frame as a whole, the end wheels supported by the external headpieces of the subframes, are connected to arms 3' or 3" which are slightly shorter than the supporting arms 3 of the intermediate wheels. The diameter of the intermediate wheels 1' is moreover lightly larger than the diameter of the end wheels. The automatic stability of the unit is thus obtained, that is to say the stability of the supporting frame-set of wheels-pneumatic Caterpillar tire is obtained. The free oscillations of the subframes is interfered with by the tension of the tubular pneumatic Caterpillar tire and by the stresses due to the forces in play.

The subframes are thus automatically aligned.

The arms 3'' of the rear subframe are provided with a device which keeps the tubular Caterpillar tire adequately stretched. This device may for instance consist of a telescopic gear 7 having exterior elastic tensors 6 adjusted for a pre-fixed limit. On account of these tensors 6, the head 7 which supports the axle of the wheel can slide in respect of the arm 3'' so as to maintain the telescopic gear at its full length.

The inextensible tubular Caterpillar tire 5 supported by the wheels 1 is thus subjected to an adequate prefixed tension stress. Whatsoever other adequate device can take obviously the place of the construction thus illustrated.

The suspension pins 4 of the subframe are furnished with a friction device 8 which brakes the free elastic oscillations of the aforementioned subframes in respect of their suspension pins 4; the amplitude of the oscillations is limited on account of this device.

The automatic reaction of the stretched tubular Caterpillar tire against the intermediate wheels, reaction which opposes every variation of the mutual position of the parts of the principal frame, keeps the aforesaid parts in their places until a stress surpassing a prefixed limit, does interfere.

The subframes are supported and aligned by means of a central center-articulated frame, consisting of two side frames centre-connected to a part 9 by means of an articulated joint. The set of wheels 1—1' is situated in the free space placed between the two side frames which thus include the train of wheels between themselves. Each member 9 (see Fig. 4) consists of a block which has two lateral hinges situated in its lower part, the hinges having parallel axles in reference with the axles 4 and 2. The side frames of the central frame consist of two arms each, obtained for instance by means of a lattice-work, consisting of the parts 11—11'—11''. The section of the arms opposes a uniform resistance to the stress of flexure, the section being triangular and the arm pyramidal with sub-horizontal axis. The vertices of each pyramidal arm form the exterior headpieces of the frame, and the axles 4 of the subframes are connected precisely to these vertices of the central frame.

The arms 11 are connected to the member 9 by means of the three vertices of their triangular base. The two lower vertices are placed in the same horizontal plane and are connected to member 9 by means of pivots 10. The upper vertex of the aforementioned base is connected to an apportionment plate by means of a pivot 12 having parallel axis with reference to the axles 4; the apportionment plate is joined to a deformable device 14 obtained by means of springs, elastic buffers or pneumatic bumpers, etc.

An interior cavity is provided in the upper part of the member 9. This cavity is divided in two by means of a vertical gate which is parallel to the plane of symmetry of the pneumatic Caterpillar tire, and normal to the direction of the motion. Two internal chambers are thus obtained in which the devices 14 are placed. Those devices 14 are axially stressed by the front and rear arms of the central frame. The arms 11 are thus connected to the member 9 by means of the pivots 10 in its lower part and of the elastic device 14 in its upper part. In this way each side frame of the central frame is elastically deformable within prefixed limits.

The elasticity of the central frame can also be obtained by means of torsion bars connected to the axles of the pivots 10. The whole principal frame joins thus the tubular pneumatic Caterpillar tire in absorbing the violent blows transmitted by the subframes.

A hole 16, perpendicular to the direction of the motion is placed on the symmetry plane of the member 9; the horizontal pin 17 is set in the aforementioned hole 16, the pin being joined to the trestle which forms the leg of the airplane.

The airplane which has two trains or sets of wheels with tubular pneumatic Caterpillar tires, is joined to them at the end of its legs by means of hinges of the same pattern as that used for the standard landing gear. The construction of the present invention has a device joining the endless track bogies to the fuselage which is similar to the device connecting the wheels to the fuselage for many known types of airplanes, for instance, the aforementioned device is used for the "Piper Cub" airplane.

The only variation in the device of the present construction consists in the absence of the two resilient parts which are generally interposed between the two rods ending in the central lower part of the fuselage and the said fuselage.

The pivot 16—17 is placed in the centre of the central frame; the load of the airplane is thus uniformly apportioned on all the wheels of the landing gear, and on the tubular Caterpillar, or more precisely: on that part of the Caterpillar which is placed between the two end wheels of the whole principal frame, through the girders of the central frame and subframes.

The wheels shift vertically on account of the unevenness of the taxiing ground. The action of the two balanced subframes reduces those shiftings to ¼.

The tubular Caterpillar tire and the absorption power of the central frame girders diminish ulteriorly the shifting.

The swinging of the airplane about the axle of the pivot 16, 17 is damped only in front; in fact a stop prevents the propeller from knocking against the ground.

A stopping device is designed for this purpose, an automatic readjusting gear is also designed which maintains the landing gear in an end of path position during the flight of the airplane, the tubular Caterpillar tire having the right position with reference to the airplane, whether during the flight or at the landing moment.

The landing gear is joined to the legs of the airplane by means of the spindles 17 so that the two tubular Caterpillar tires of the sets of wheels be parallel to each other.

If the landing gear was absolutely free in its rotation, it could take non-correct positions during the flight, which would endanger the flying airplane and its landing.

A re-adjusting gear acts so that the landing gear is locked in a prefixed antisomersault position during flight. The re-adjusting gear comprises a stop member and an abutment member 9' which are respectively connected to the leg 22 of the undercarriage of the aeroplane and the supporting frame 9 of the landing gear. This stopping device may be obtained as follows: the member 9 is shaped as shown in Figs. 7a and 7b so as to comprise an abutment surface 9' against which the stop member 19 attached to the undercarriage leg 22 engages so as to fix the landing gear in the predetermined flight position. An automatic re-adjusting gear 21 disposed between the member 19 and a fixed pin 20 at the upper part of 9 constrains the landing gear to the correct flight position whenever required.

The tensor 21 exerts a force which does not pass through the pin 16—17 and gives a flying-tail-down moment which keeps the landing gear in the position assumed at the end of the path, the stopping device 9—19 retaining the landing gear in the aforementioned position.

The moment originated by the elastic system 18 prevents the oscillation of the tubular Caterpillar tire even if the tubular Caterpillar tire is subjected to the aerodynamic action of the wind. But this aforesaid moment is less than the moment originated by the weight of the airplane; the moment being calculated in respect of the axis of the pivoting; and than the moment originated by the support of the "horizontal rudder" elevator calculated in respect of the same axis.

When taxiing the airplane is free to swing from the position of maximum raising of the elevator, down to the position of nondangerous diving, in reference to the flying line, and the pilot can freely change this position and maneuver for the takeoff and landing.

During the flight of the airplane, the landing gear is maintained in a flying tail-down position on account of the adjusting gear 19—20—21. When landing, even if the airplane is on a flight line, the landing gear will thus come into contact with the ground by means of the rear end of the tubular Caterpillar tire 5. A progressive starting of the motion of the tubular Caterpillar tire and wheels will thus be obtained. This progressive starting is a most important thing and is also favoured by the fact that the rear wheel of the plane begins to rotate on its pivot at the first contact of the plane with the ground. The weight of the plane does not interfere with the starting acceleration of the tubular Caterpillar tire.

The wheels of the landing gear will touch the ground one after the other and all the rolling gear will thus start with reduced stresses.

It is evident that it will be possible to design landing gears having all the aforesaid characteristics and a greater number of wheels. It will be possible for instance to design trains or sets of wheels having a larger transversal section; that is to say: to design multigrooved wheels supporting more than one tubular Caterpillar tire or to design more complex sets consisting of two or more elementary tubular Caterpillar tires, placed parallelly side by side. It will be possible in the same way to design other constructions having a greater number of aligned wheels. The performance of those constructions will thus be the same as that of the afore-illustrated construction.

In this case the central frame will support the two subframes by means of rocker arms; these subframes will support at each end the supporting axles of a couple of wheel frames. The headpieces of the wheel frames will support the axles of the wheels.

According to this principle it will be possible to design trains or sets of wheels having whatsoever required number of wheels.

What I claim is:

1. A landing gear for aircraft having an under carriage supporting a transversely extending axle, said landing gear comprising a main beam pivotally mounted intermediate its ends on said axle, a forward subframe pivotally mounted intermediate its ends on the forward end of the main beam, a rear subframe pivotally mounted intermediate its ends on the rear end of the main beam, wheels having grooved peripheral surfaces mounted at the ends of the subframes, an endless tubular pneumatic tire mounted on the grooved surface of said wheels, and means for maintaining said tire under tension.

2. A landing gear for aircraft having an under carriage supporting a transversely extending axle, said landing gear comprising a central supporting member pivotally mounted on said axle, a pair of transversely spaced side frames extending forwardly from the central member, a pair of transversely spaced side frames extending rearwardly from the central member, a pair of beams forming a forward subframe, means pivotally mounting the forward subframe intermediate the ends of the beams on the free end of the forward pair of side frames, a pair of beams forming a rear subframe, means pivotally mounting the rear subframe intermediate the ends of its beams on the free end of the rear pair of side frames, a wheel having a grooved peripheral surface carried by the forward and rear ends of each subframe, with the wheels of both subframes in longitudinal alignment, an endless flexible inextensible tubular pneumatic tire carried by said wheels, the axles of said wheels and the means for mounting the subframes on the side frames being parallel to the transversely extending axle of the under carriage and perpendicular to the direction of flight of the aircraft, and means for maintaining the constant tension of the tire.

3. A landing gear according to claim 2 including means for pivotally mounting the side frames on the central supporting member for pivotal movement about transverse axes parallel to said axle, and means for resiliently limiting pivotal movement of the side frames.

4. A landing gear according to claim 2 in which the side frames comprise three longitudinally extending members joined together at the free end of the frame and having their other ends spaced apart in triangular formation with said other ends of two of the longitudinally extending members pivotally connected to the lower portion of the central supporting member and resilient means interposed between the other end of the other longitudinally extending member and the upper portion of said supporting member.

5. A landing gear according to claim 2 including means for pivotally mounting the side frames on the central supporting member for pivotal movement about transverse axes parallel to said axle, and means for resiliently limiting pivotal movement of the side frames, the upper front and rear portions of said central supporting member having recesses for receiving and housing said means for resiliently limiting pivotal movement of the side frames.

6. A landing gear according to claim 2 including means for pivotally mounting the side frames on the central supporting member for piovtal movement about transverse axes parallel to said axle, and means for resiliently limiting pivotal movement of the side frames including torsion bars.

7. A landing gear according to claim 1 in which the distance between the intermediate pivotal axis of the forward sub-frame and the rear wheel axle carried thereby is greater than the distance between said intermediate pivotal axis and the axle of the front wheel and in which the distance between the intermediate pivotal axis of the rear sub-frame and the axle of the front wheel carried thereby is greater than the distance between intermediate pivotal axis of the rear sub-frame and the axle of the rear wheel carried thereby.

8. A landing gear according to claim 7 in which the rear wheel of the forward sub-frame and the front wheel of the rear sub-frame are of larger diameter than the other wheels of said sub-frames.

9. A landing gear according to claim 1 including friction means for damping oscillations of the sub-frames about their intermediate pivotal axes.

10. A landing gear for aircraft having an under carriage supporting a transversely extending axle, said landing gear comprising a main beam pivotally mounted intermediate its ends on said axle, a forward sub-frame pivotally mounted intermediate its ends on the forward end of the main beam, a rear sub-frame pivotally mounted intermediate its ends on the rear end of the main beam, wheels having grooved peripheral surfaces mounted at the ends of the sub-frames, an endless tubular pneumatic tire mounted on the grooved surface on said wheels, and means for maintaining said tire under tension including means for mounting the rear wheel of the rear sub-frame for longitudinal movement and means for urging said wheel rearwardly.

11. A landing gear according to claim 1 in which an antisomersault stopping device is provided which limits the turn of the landing gear relative to the under carriage leg, this stopping device comprising a stop member and an abutment member, the one being connected to the under carriage and the other to the landing gear in such a way that the abutment member engages the stop member in a predetermined position of the landing gear relative to the flying attitude of the aircraft.

GIOVANNI BONMARTINI.

References Cited in the file of this patent

UNITED STATES PATENTS

| Number | Name | Date |
| --- | --- | --- |
| 1,096,815 | Kegresse | May 21, 1914 |
| 1,552,283 | Elder | Sept. 1, 1925 |
| 2,051,864 | Knox | Aug. 25, 1936 |
| 2,333,107 | Knox | Nov. 2, 1943 |
| 2,342,110 | Barber | Feb. 22, 1944 |
| 2,458,549 | Bachman | Jan. 11, 1949 |